(12) United States Patent
Jenkin

(10) Patent No.: US 10,962,089 B2
(45) Date of Patent: Mar. 30, 2021

(54) CLAMPING DEVICE FOR A CABLE

(71) Applicant: Siemens Aktiengesellschaft, Munich (DE)

(72) Inventor: Kieran Jenkin, Millom (GB)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/558,058

(22) Filed: Aug. 31, 2019

(65) Prior Publication Data

US 2019/0383356 A1  Dec. 19, 2019

Related U.S. Application Data

(62) Division of application No. 15/556,739, filed as application No. PCT/EP2016/055661 on Mar. 16, 2016, now Pat. No. 10,458,516.

(30) Foreign Application Priority Data

Mar. 17, 2015  (EP) .................................... 15159465

(51) Int. Cl.
*F16G 11/04* (2006.01)
*F16G 11/06* (2006.01)
*H02G 1/10* (2006.01)
*H02G 3/32* (2006.01)

(52) U.S. Cl.
CPC ............ *F16G 11/048* (2013.01); *F16G 11/06* (2013.01); *H02G 1/10* (2013.01); *H02G 3/32* (2013.01)

(58) Field of Classification Search
CPC ............. Y10T 24/3969; Y10T 24/3996; F16G 11/048; F16G 11/06
See application file for complete search history.

(56) References Cited

U.S. PATENT DOCUMENTS 3,041,575 A * 6/1962 Schneider ............ H01R 4/5025
439/393
3,219,365 A   11/1965 Webb
(Continued)

FOREIGN PATENT DOCUMENTS

GB     2169993 A    7/1986
JP  2001200896 A    7/2001
(Continued)

OTHER PUBLICATIONS

EP Search Report dated Sep. 30, 2015, for EP patent application No. 15159465.2.
(Continued)

*Primary Examiner* — Robert Sandy
(74) *Attorney, Agent, or Firm* — Wolter Van Dyke Davis, pllc

(57) ABSTRACT

A clamping device of a clamping unit for at least one cable has a clamping member with at least one receptacle for the at least one cable, wherein a cross section of the at least one receptacle is adjustable, and has at least one adjustment element that is embodied in such a way so that it takes effect on the clamping member so that the cross section of the at least one receptacle is adjusted. The at least one adjustment element is embodied as a preloadable element. A clamping unit has at least one clamping device and a housing surrounding the clamping device.

10 Claims, 10 Drawing Sheets

(56) References Cited

U.S. PATENT DOCUMENTS

| | | | | |
|---|---|---|---|---|
| 4,408,926 A | * | 10/1983 | Werner | F16B 2/14 |
| | | | | 403/300 |
| 4,508,409 A | * | 4/1985 | Cherry | H01R 4/2491 |
| | | | | 174/84 R |
| 4,676,540 A | | 6/1987 | Dotti | |
| 4,752,252 A | * | 6/1988 | Cherry | H01R 4/5025 |
| | | | | 439/784 |
| 9,455,526 B2 | * | 9/2016 | Morby | H01R 4/5025 |
| 9,506,250 B2 | * | 11/2016 | Gilling | E04C 5/165 |

FOREIGN PATENT DOCUMENTS

| | | | |
|---|---|---|---|
| SU | 872864 | A1 | 10/1981 |
| SU | 1030601 | A1 | 7/1983 |
| SU | 1174630 | A1 | 8/1985 |

OTHER PUBLICATIONS

International Search Report dated May 27, 2016, for PCT/EP2016/055661.

* cited by examiner

CLAMPING DEVICE FOR A CABLE

CROSS REFERENCE TO RELATED APPLICATIONS

This application is a divisional of and claims priority to pending U.S. application Ser. No. 15/556,739, filed Sep. 8, 2017, which is the US National Stage of International Application No. PCT/EP2016/055661 filed Mar. 16, 2016, and claims the benefit thereof. The International Application claims the benefit of European Application No. EP15159465 filed Mar. 17, 2015. All of the applications are incorporated by reference herein in their entirety.

FIELD OF INVENTION

The present invention relates to a clamping device of a clamping unit for at least one cable, comprising a clamping member with at least one receptacle for the at least one cable, wherein a cross section of the at least one receptacle is adjustable, and further comprising at least one adjustment element that is embodied in such a way so that it takes effect on the clamping member so that the cross section of the at least one receptacle is adjusted and the invention further relates to a clamping unit with at least one of such a clamping device and a housing surrounding the clamping device.

ART BACKGROUND

In the near future an increasing demands of communication over wide distances, especially for example between continents and power supply cables to more inaccessible infrastructures will be needed. Hence, infrastructures, like sea cables and connectors linking sea cables and modules, e.g. subsea modules, like transformers, pumps etc., that are located and operated error proof subsea will be essential.

Subsea cables are normally handled subsea by a so called Remotely Operated Vehicle (ROV). Theses ROVs may impart so called snag loads on the cable during or after deployment subsea. Due to this, the cable can be pulled relative to the connector during handling, imparting a load which without suitable protection would result in damage to the termination portion of the connector, or even complete disconnection of the cable end from the connector. At this point retrieval of the cable and/or the connector is a very costly exercise. To minimize a risk of such a scenario subsea cables are equipped with a clamping unit or a cable grip, respectively, for positioning the cable in a wanted spatial arrangement, e.g. in respect to the connector. Moreover, such a grip ensures that different layers of the cable may keep their respective positions.

It is for example known to use a 'passive' clamp, in that once the clamp is assembled, the clamp components do not move. The load applied will change as environmental factors like temperature, pressure and subsequently stress-relaxation/compression-set of any of the components in that system alter the geometry of the critical components (not least of which being the cable itself). These geometry changes cause fluctuations in the pressure exerted by the fixed position clamp. These changes in the cable geometry (which occur after the grip has been assembled) cause the clamping force of the grip to reduce significantly, resulting in a compromised cable restraint system, and potentially damaging adjoining equipment. For example should the cable undergo expansion due to temperature rise, there is no scope for the passive clamp to allow for this change. Assuming the clamp was tightened to its full force at room temperature, the pressure exerted on the rubber cable as a result of thermal expansion is significant. The cable has no option but to deform under that pressure, and effectively flow from the high pressure region, causing the clamp to lose effectiveness as the volume of material it is acting on reduces, particularly if the temperature causing the expansion subsequently drops.

SUMMARY OF INVENTION

It is a first objective of the present invention to provide a clamping device of a clamping unit for a cable that provides secure, reliable and non-damaging handling of the cable with wear-free and non-compromising conditions or operations for the cable.

It is a further objective of the present invention to provide a clamping unit with at least one of such a clamping device that provides secure, reliable and non-damaging handling of the cable with wear-free and non-compromising conditions or operations for the cable. These objectives may be solved by a clamping device and a clamping unit according to the subject-matter of the independent claims.

According to a first aspect of the present invention, a clamping device of a clamping unit for at least one cable, comprising a clamping member with at least one receptacle for the at least one cable, wherein a cross section of the at least one receptacle is adjustable, and further comprising at least one adjustment element that is embodied in such a way so that it takes effect on the clamping member so that the cross section of the at least one receptacle is adjusted is provided.

It is proposed, that the at least one adjustment element is embodied as a preloadable element. Due to the inventive matter, a device can be provided that is able to react to environmental changes. These changes may occur due to thermal expansion or contraction of the cable and related parts, and/or cable deformation due to pressure exerted on it. The inventive clamping device allows the cable to expand during thermal rise, thus reducing the extrusion of the layers of the cable. The inventive clamping device also allows the cable to contract, whilst still applying sufficient clamping pressure to suitably restrain the cable.

Moreover, a clamping force acting on the cable can be held constant in comparison with state of the art systems. This clamping device differs from existing designs in that the mechanism is dynamic, and can actively compensate for diametrical geometry changes in the system (particularly the cable) after the clamping unit/grip has been assembled. Hence, the inventive design allows a dynamic compensation or adjustment of the clamping device. Further, external manipulations from external sources are unnecessary saving costs and work time. Moreover, the clamping force can be applied in such a way so that the clamping action can act on all radially arranged layers of the cable preventing a misalignment of the layers or a loss of a required spatial arrangement of the cable layers. This is especially advantageous for cables with elastomer layers.

Another benefit of the clamping device is that it allows very little axial movement of the cable. Further, since the clamping device has a self-adjusting mechanism other means or feature provided to compensate stresses in the cable and which are integrated in state of the art systems, like cutaway features, can be omitted. This result in an increased surface contact area between the clamping device and the cable and reduces extrusion gaps in comparison with systems with cutaway features. Additionally, this eliminates access to large portions of the clamping device (unit)/cable interface by surrounding mediums such as oil. This improves the frictional contact between the clamping device and the cable surface.

Moreover, the clamping divide allows the cable to be gripped without damaging or degrading it in all material conditions (i.e. whether the cable is large or small in its allowable size range). Further, it can accommodate changes in cable size through e.g. thermal expansion.

Even if the terms "clamping device, cable, clamping member, receptacle, adjustment element, preloaded element, spring, elastic ring, wall, slot, section, preload arrangement, bolt, nut, aperture, surface, flange, shim, and abutment element, tapered section, housing, surface, holding element, tooth, recess and locking element" (see also below) are used in the singular or in a specific numeral form in the claims and the specification the scope of the patent (application) should not be restricted to the singular or the specific numeral form. It should also lie in the scope of the invention to have more than one or a plurality of the above mentioned structure(s).

In this context a clamping device is intended to mean an arrangement of pieces that transfer a clamping force, especially a radial clamping force, indirectly and advantageously directly to a target structure, like the cable. Advantageously, the clamping device is an assembly of fixedly mounted pieces, wherein this assembly is solely responsible for the radial clamping force. A clamping unit is intended to mean a unit comprising at least one clamping device and a housing advantageously partly surrounding the at least one clamping device. The clamping unit may comprise further pieces or devices, like a handle, a connecting structure or flange etc. A cable may be any cable feasible for a person skilled in the art and advantageously the cable is a subsea cable and especially a high voltage subsea cable. In this context, a clamping member is intended to mean an element or a plurality of elements which directly interact with or contact the target structure (cable) to clamp it in a wanted position or configuration. The clamping force can be either facilitated by a characteristic or property of the clamping member itself or can be applied by a separate piece or assembly of pieces to the clamping member.

Moreover, a receptacle of the clamping member is intended to mean a structure that is embodied or enabled to receive the cable. The receptacle is advantageously an orifice being at least partially surrounded by at least one wall. The wall is advantageously a part of the clamping member. Further, the wall can be embodied as a plurality of wall segments, wherein different wall segments might be formed integrally with each other e.g. divided by gaps in the wall or they may be arranged at different pieces of the clamping member. The orifice can have any shape feasible for a person skilled in the art and advantageously, has a round shape. Thus, the wall/wall segments is/are arranged circumferentially around the orifice. A cross section depends on the shape of the orifice and is advantageously a diameter of the orifice. Hence, a diameter of the orifice is adjustable or varies depending on the force acing on the clamping member or the wall of the receptacle. The force in turn is dependent of a cross section or specifically a diameter of the cable.

In this context an adjustment element is intended to mean an element that can transfer a force on the clamping member, wherein this results in a change of the cross section of the receptacle or specifically its orifice. Moreover, the term "preloadable" should be understood as the ability to undergo an elastic deformation and thus to store energy due to this elastic deformation. The stored energy is a reset force.

Furthermore, the adjustment element or preloadable element, respectively, is a self-acting element. In other words, the adjustable element/preloadable element is able to store energy and react to external impulses due to this saved energy or reset force all on its own. The preloadable element may be any element suitable for a person skilled in the art, like a spring, a rubber block, an elastomer cushion, an elastic element or ring etc.

Furthermore, it is provided that the preloadable element is a spring, supplying an element that is easy to manufacture and assemble. Furthermore, the design incorporates spring(s) to enable the clamping device to apply a clamping force with little variance in performance despite changes in the cable geometry which might occur after installation of the clamping unit or cable grip, respectively, in equipment such as for example a subsea power connector harness.

Advantageously the spring is a coil spring, a disc spring and/or a wave spring. This provides a great freedom in possible designs as well as in choosing selected spring properties depending on the used components or materials, e.g. of the clamping member. Especially by selecting one specifically embodied spring type the spring force can be purposefully selected on the type of the cable used. Moreover, it would be also possible to use two or a plurality of springs arranged in series e.g. a package of disc springs.

The challenges seen in developing this mechanism consisted of tailoring the applied spring force to ensure consistently high enough clamping force to retain the cable sufficiently, whilst not applying excessive force which would result in the clamping device itself deforming the cable beyond acceptable limits.

Alternatively, the preloadable element may be an elastic element, for example embodied as an elastic ring e.g. out of a rubber moulding. Due to this, a balance between enough force to grip the cable securely and a gentle force to leave the cable undamaged can be easily provided. Moreover, this allows the cable to be gripped without damaging or degrading it. An elastic element or ring may be for example arranged in circumferential direction around the clamping member. Thus, a space efficient construction can be provided. In an embodiment, the elastic element or ring may be positioned in a recess extending along a contour or a circumference of the clamping member. Hence, an axial positioning of the elastic element or ring may be ensured. Further, a radial span of the clamping member with the assembled elastic element or ring may be shortened. Advantageously, two or a plurality of elastic elements or rings may be provided. The elastic elements or rings may be spaced apart equidistantly along an extension of the clamping member. This provides that a homogenous load can be applied to the clamping member along the whole extension of the elastic elements or rings or all along the axial extension of the clamping body.

By arranging the clamping member with the elastic element or ring in a housing the elastic element or ring might be compressed to generate the final compressive force to hold the cable. In this context "compress" should be understood as a reducing of a material thickness of the elastic element or ring to a smaller diameter than a diameter in an uncompressed state of the elastic element or ring. Moreover, a material thickness should be understood as the difference between an outer radius of the elastic element or ring and an inner radius of the elastic element or ring.

As stated above the receptacle comprises at least one orifice and a wall partially encompassing the at least one orifice. It is further provided, that the wall comprises at least one slot to constructively easily compensate the adjustment of the cross section of the receptacle. The clamping member has an axial extension and the slot extends all along this axial extension. Thus, the slot extends in a longitudinal direction of the clamping member and coaxially to an axis of the clamping member. Moreover, the slot interrupts a continuous contour or circumference, respectively, of the clamping member or the wall.

In an embodiment the clamping member is basically embodied as a cylindrical tube, advantageously as a slotted sleeve and especially as a clamp sleeve. Hence, the clamping member is an easy to manufacture piece and can be embodied robust and reliable. In this context embodied as "basically a cylindrical tube" is intended to mean that the clamping member or parts thereof assembled together in an operational state form a tube or tube-like structure. Slight variances of the shape from a strictly tubular shape, like slightly oval shape, should not hinder the definition of tube or tube-like.

It is sufficient to provide one single slot so that the cross section of the orifice can be adjusted. By providing two or more slots, arranged over a contour or a circumference of the clamping member a more homogeneous adjustment can be provided. The preloaded element is arranged in a functional configuration with the slot. For example the preloadable element may be arranged in the slot. This would be suitable if the preloadable element would be embodied as a rubber block or an elastomeric cushion.

In an embodiment of the invention the clamping member comprises two sections, wherein each section is comprises a half-shell region—radially—restricting the orifice of the receptacle. Thus, a contact surface of the clamping member is matched to the circular contact surface of the cable providing a homogeneous contact between the clamping member and the cable as well as a homogeneous load transmission. A half-shell region is intended to mean a piece that comprises at least a half-shell and if needed other components, like for example flanges etc. An inner shape of the half-shell region is half-round. An outer shape of the half-shell region may be any shape feasible for a person skilled in the art, like rectangular or also circular. In the latter case the two half-shell regions form a tube-like structure or a collar that is divided by two symmetrically arranged slots. The two sections can be embodied as two half-shells.

According to an alternative embodiment of the invention the clamping member comprises at least three sections arranged in circumferential direction of the clamping member one after the other. Hence, the adjustment of the cross section can be advantageously flexible depending on the location of the size changes. Another advantage of the increased number of segments is that more preloadable elements can be packaged into a similar space envelope, and the force is distributed more uniformly when taking friction and cable rigidity into account. As such the force applied can be carefully suited to each cable type and diameter being used.

This can be manufactures easily and cost saving when all sections are embodied equally and constructively easy when each section spans about 120° of a circumference of the clamping member. In this context the wording "about 120°" is intended to mean that the circumferential span of the section may be 120°±5°. Basically each section and one of the circumferentially adjoining slots span 120° of the circumference. The sections act as clamping jaws on the cable.

The two sections of the clamping member or two sections of the clamping member that are arranged in circumferential direction on opposed sides of the slot or one slot are fastened to one another by a fastening arrangement, providing a reliable connection of the sections. The fastening arrangement may be embodied in any way feasible for a person skilled in the art, like a clamp or via the preloadable element itself (e.g. in case of the embodiment of the preloadable element as a rubber block or an elastomeric cushion fixed into the slot). Advantageously, the fastening arrangement comprises a bolt especially a threaded bolt and at least one corresponding nut. The bolt may have an integrally formed bolt head or a second nut screwed to the bolt. By means of a screwing connection of the bolt with the nut the sections are connected to one another. The fastening arrangement is advantageously embodied as a preload arrangement, wherein two functions, namely the fastening and the preloading, can be combined in one arrangement of pieces saving mounting time and space as well as costs.

Hence, in a further realisation of the invention it is provided that the clamping device comprises at least one preload arrangement comprising a bolt and at least one corresponding nut, wherein the bolt and the at least one corresponding nut connect two sections of the clamping member that are arranged on opposed sides of the at least one slot.

A space saving arrangement can be gained when the preloadable element is mounted on the bolt. It is further provided, that the preloadable element is held in its preloaded state by the bolt and the at least one corresponding nut. Thus the preloading can be easily adjusted during the assembly process especially in dependency of the needed spring force and the properties of the used materials and pieces, like the cable. The connection between the bolt or the nut and the preloadable element may be a direct contact or an indirect contact via an intermediate piece, like e.g. a shim.

By the integrally formed fastening arrangement and the preload arrangement the preloadable element and the clamping member or the respective segments are fastened to on another by the bolt and the at least one corresponding nut. In this context "integrally formed" should be understood as such that the fastening arrangement and the preload arrangement are built from the same pieces. It may be also possible, that the bolt may form the preloadable element itself. Thus, further pieces, assembly efforts and costs can be saved. The bolt may for example be embodied as a custom machined spring bolt, like one provided from ABSSAC™.

Advantageously, the clamping member comprises a first aperture and at least a second corresponding aperture, wherein the first aperture and the at least second aperture are being arranged in direction of the contour/circumference of the at least one clamping member on either side of the slot. By these apertures the bolt can be securely accommodated at the clamping member or the two sections on either side of the slot. Thus, the bolt extends through both apertures.

This is easily realised when the first apertures comprises a first stop surface and the at least second aperture an at least second stop surface and wherein the bolt abuts the first stop surface of the first aperture and wherein the preloadable element is held in its preloaded state between the at least second stop surface of the at least second aperture and the at least one nut. Due to this, also the preloadable element is fixed.

According to a further realisation of the invention at least two preload arrangements or a plurality of preload arrangements are provided, wherein the two preload arrangements or the plurality of preload arrangements are arranged in parallel to one another. Hence, a homogenous load can be applied to the clamping member along the whole extension of the parallel arranged preload arrangements or depending on the arrangement of the preload arrangements in respect to the axial extension of the clamping body all along this axial extension.

In an embodiment of the invention a direction of a loading force of the preloadable element is arranged basically tangential in respect to the receptacle of the clamping member. With this arrangement a leverage force is generated that needs only a minimal preload force but has a sufficient holding force.

Alternatively and/or additionally a direction of a loading force of the preloadable element is arranged axially to an axis of the clamping member. Thus, the overall arrangement can be realised in a tight installation space due to the small space requirements.

In a further alternative and/or additional embodiment a direction of a loading force of the preloadable element is arranged radially to an axis of the clamping member. Hence, the loading force can act in a direct manner on the clamping member and thus the cable.

It is further provided that the clamping member comprises at least two radial flanges that where arranged on opposed sides of the slot. Thus mounting space for the preloadable element as well as for the fastening arrangement or the preload arrangement, respectively, is provided. One of the flanges comprises the first aperture and the other flange the second corresponding aperture.

According to a further advantageous aspect of the present invention the clamping device comprises a preload unit, comprising at least two preload arrangements, each comprising a bolt and at least one corresponding nut, and further comprising at least one shim, or advantageously a cover shim, wherein the preloadable element is embodied as a wave spring and wherein the at least one shim is positioned in such a way by the bolt and the at least one corresponding nut so that it distributes a loading force of the wave spring to the at least two preloading arrangements. As a result, the spring force is supported by at least two preload arrangements.

In an advantageously embodiment of the invention the clamping device comprises a first axial abutment element for the preloadable element, wherein the first abutment element is arranged axially moveable due to an axial loading force applied by the preloadable element. Thus, an axial position of the first abutment element can be easily manipulated by the preloadable element.

A constructively easy interaction with the clamping member may be gained when the first abutment element has at least one tapered section and wherein the clamping member comprises at least one corresponding tapered section and wherein the at least one tapered section of the first abutment element and the at least one corresponding tapered section of the clamping member translate an axial loading force of the preloadable element in a circumferential surface load of the clamping member. Hence, an evenly distribution of the clamping force can be provided all along the circumference of the clamping member and thus the cable. The axial force of the preloadable element is converted or transformed into a circumferential surface load. To ensure a homogenous load the first abutment element extends at least along 180° of the circumference of the clamping member. Advantageously the first abutment element is a ring with a tapered inner diameter.

According to a further aspect of the present invention the clamping device comprises at least a second abutment element that is axially fixed in respect to an axial position of the preloadable element or in respect to a stopper of the preloadable element or to a housing of the clamping unit. Thus, an axial movement of the clamping member can be restricted. In this context "an axial position" of the preloadable element is intended to mean the position of the part being unaffected by the loading force of the preloadable element or the part of the preloadable element that abuts the stopper.

It is further provided, that the at least second abutment element has at least one tapered section and/or wherein the clamping member comprises at least one corresponding tapered section and wherein the at least one tapered section of the second abutment element translates a circumferential surface load on the at least one corresponding tapered section of the clamping member. Due to this a force transmission can be applied to the cable symmetrically. The characteristics stated above for the first abutment element can be also applied for the second abutment element (despite the axial movement).

According to a further realisation of the invention the wall of the receptacle of the clamping member comprises an inner surface that comprises at least one holding element. Hence, the cable can be hold more securely into position. A holding element can be embodied in any way feasible for a person skilled in the art, like a roughened surface, a hook or a tooth. For example, the holding element should be designed to be small enough that it does not penetrate through the entire cable sheath and to cause only very minor indentations to the sheath. However, as the holding element does bite into the jacket it removes the reliance on friction to provide the restraining force between cable and sheath. Advantageously, the holding element has a depth in radial direction of about 0.01% to 5% of the diameter of the receptacle. Moreover, the holding element is formed integrally with the wall of the clamping member or one of its sections. Thus, a secure arrangement of the holding element and thus of the cable can be provided.

Advantageously, the holding element extends at least partially along an axial extension of the clamping member. Thus, the clamping device can resist a twisting force on the cable. The holding element may also extend along the whole extension of the clamping member. Alternatively or additionally, the holding element extends at least partially along a circumference of the clamping member providing resistance to a pulling force on the cable. It may be also feasible if the holding element extends in circumferential direction only along one of the segments or sections of the clamping member or only along parts thereof. Combining both orientations advantageously provides a clamping device that can resist both pulling and twisting forces on the cable. Moreover, the holding element may also extend inclined or diagonally.

According to a further aspect of the present invention, a clamping unit with at least one inventive clamping device and comprising a housing surrounding the at least one clamping device is presented.

It is proposed that the clamping unit comprises at least one locking element to provide an axial locking of the at least one clamping device with the housing.

Due to the inventive matter, a clamping unit or a gripping unit or a cable grip can be provided that ensures that the clamping device is held in the correct axial position. Thus, the clamping unit has a secure but actively adjustable connection to the cable as well as an ensured axial positioning.

The above-described characteristics, features and advantages of this invention and the manner in which they are achieved are clear and clearly understood in connection with the following description of exemplary embodiments which are explained in connection with the drawings.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
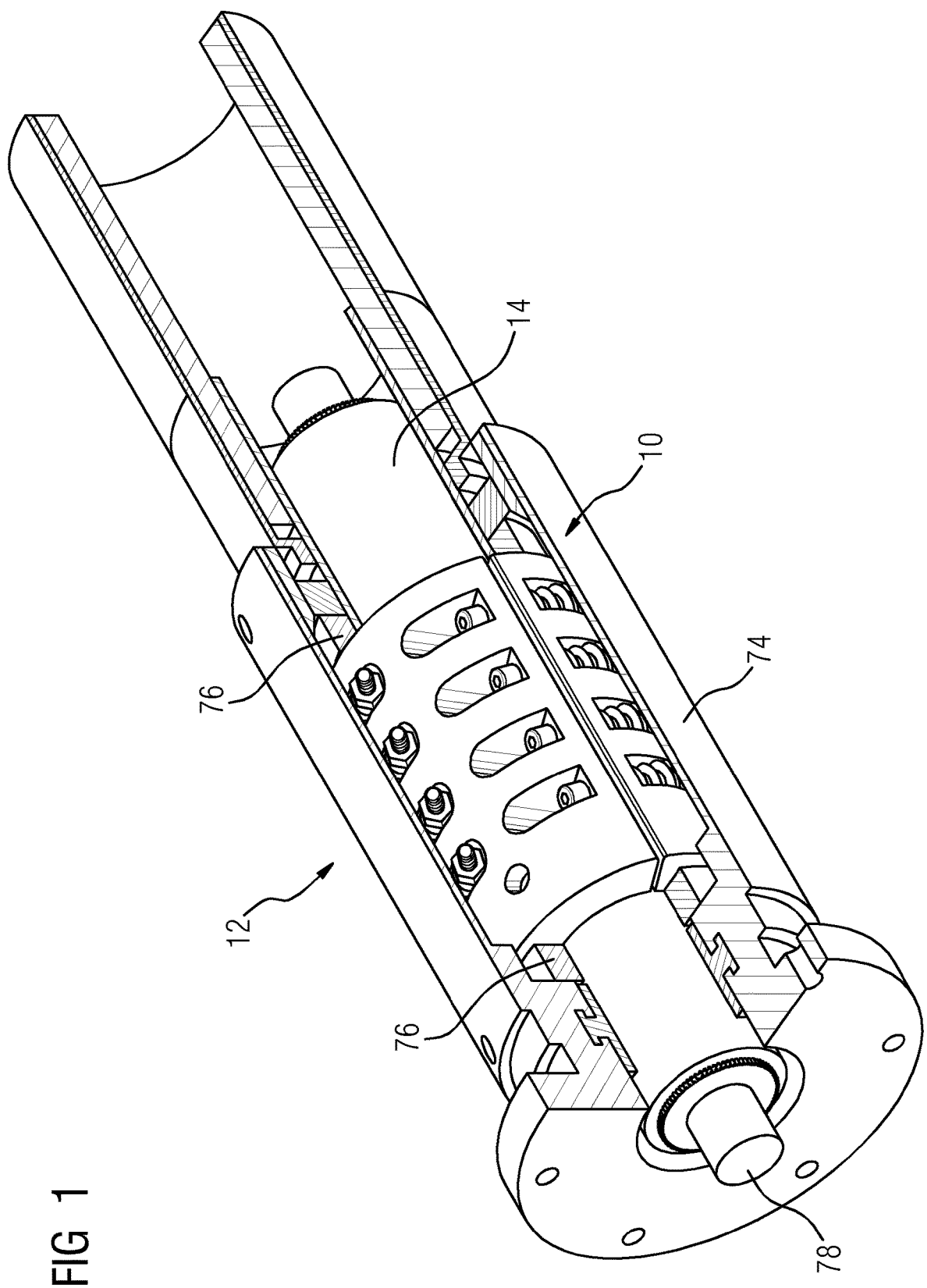
FIG. 1: shows schematically a clamping unit for a cable with the cable and a clamping device.

The illustrations in the drawings are schematical. It is noted that in different figures, similar or identical elements are provided with the same reference signs.

FIG. 1 shows a clamping unit 12 or a cable grip for a cable 14, especially a subsea cable 14. The cable 14 has a layered structure, wherein the layers 78, like a copper core or an insulation, may not be bonded or connected to one another in the cable 14. Thus, to ensure a connection of the layers 78 and to compensate changes in the cable geometry due to thermal expansion or contraction of the cable 14 or related parts, and/or cable deformation due to pressure exerted on it, the clamping unit 12 comprises a clamping device 10 encompassing the cable 14 circumferentially. The clamping device 10 in turn is circumferentially surrounded by a housing 74. To fix the clamping device 10 in an axially defined position in the clamping unit 12 the clamping unit 12 or its housing 74, respectively, comprises a locking element 76 arranged on either side of the clamping device 10 and which axially restrict a movement of the clamping device 10. A flange at the axial end of the housing 76 is provided to allow the clamping unit 12 to be affixed to the unit/connector the cable 14 is terminated to (not labelled with reference signs).

Figure 2:
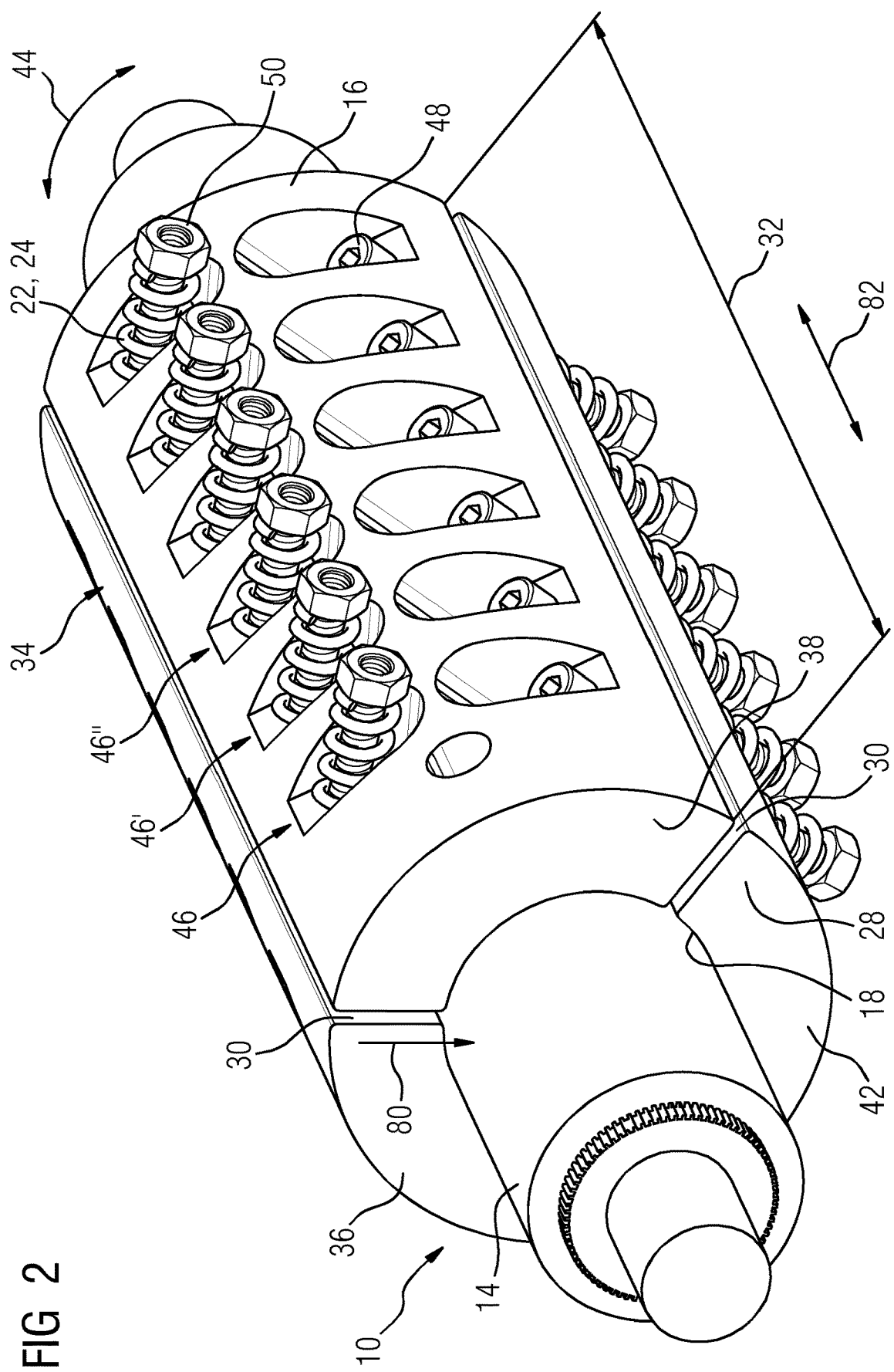
FIG. 2: shows schematically the cable and the clamping device from FIG. 1, FIG. 3: shows schematically the clamping device from FIG. 1, FIG. 4: shows a cross section along line IV-IV through the clamping device from FIG. 3, FIG. 5: shows the results of a pull test performed on the cable positioned in the clamping device from FIG. 3 by means of a diagram.
Figure 3:
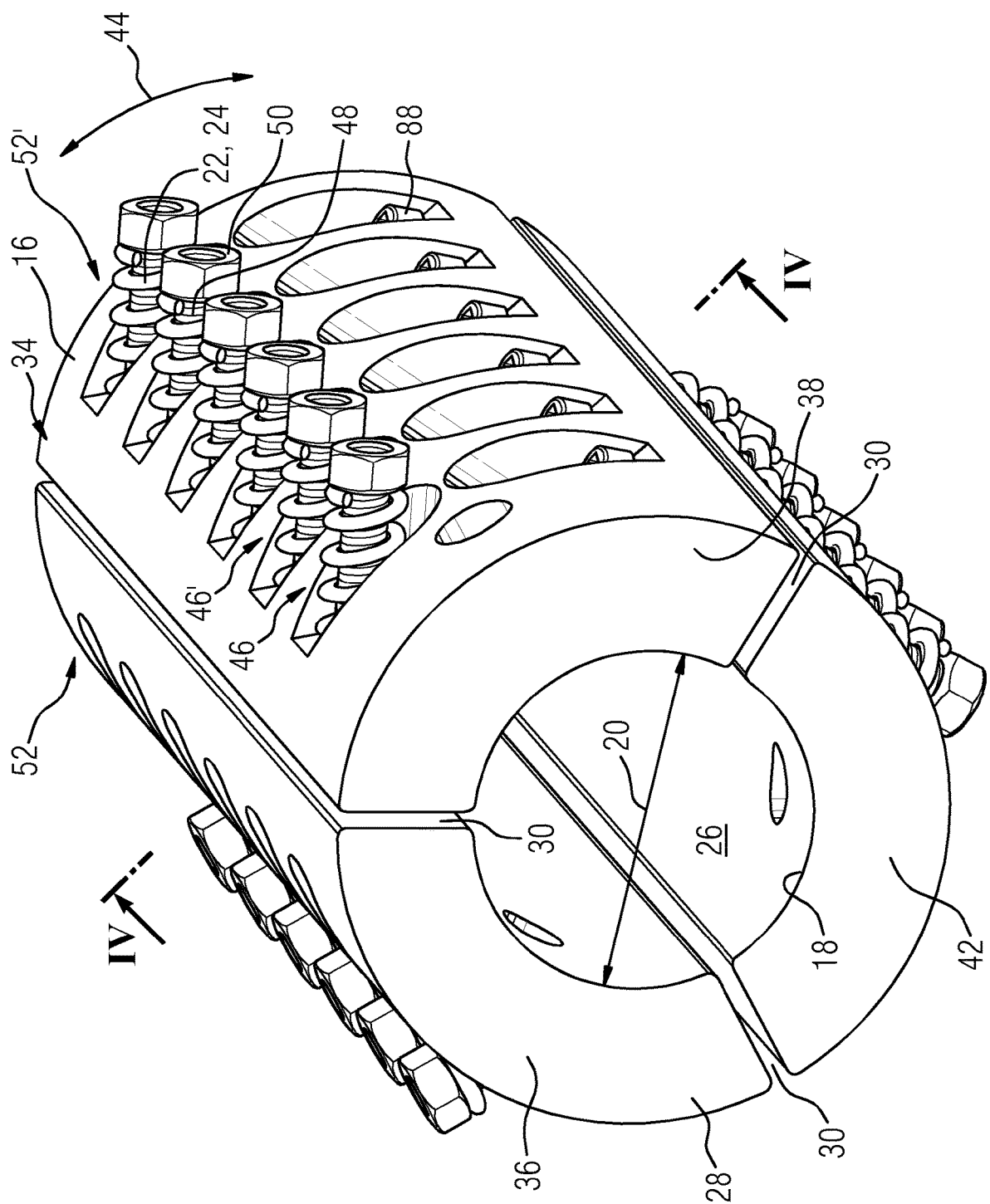

The clamping device 10 with the cable 14 is shown in more detail in FIG. 2 and without the cable 14 in FIG. 3. The clamping member 16 has a receptacle 18 for the cable 14, wherein the receptacle 18 comprises an orifice 26 that is surrounded by a wall 28. The clamping member 16 or the wall 28 comprises three sections 36, 38, 42 that are arranged in circumferential direction 44 of the clamping member 16 one after the other. Two adjacently arranged sections 36, 38, 42 are separated by a slot 30 extending in radial direction 80 and in axial direction 82 all through the wall 28 or all along an axial extension 32 of the clamping member 16.

Each section 36, 38, 42 and the adjacently arranged slot 30 spans about 120° of a circumference of the clamping member 16, thus the clamping member 16 is embodied as a cylindrical tube or as a clamp sleeve 34.

As stated above, the clamping device 10 is able to compensate changes of a geometry of the cable 14. Therefore, to embody a cross section 20 of the receptacle 18 adjustable the clamping device 10 comprises an adjustment element 22 that is embodied in such a way so that it takes effect on the clamping member 16 so that the cross section 20 of the receptacle 18 is adjusted. The adjustment element 22 is embodied as a preloadable element 22 and specifically as a spring 24 or a coil spring 24. Hence, a clamping force with little variance in performance despite changes in the cable geometry can be applied.

Figure 4:
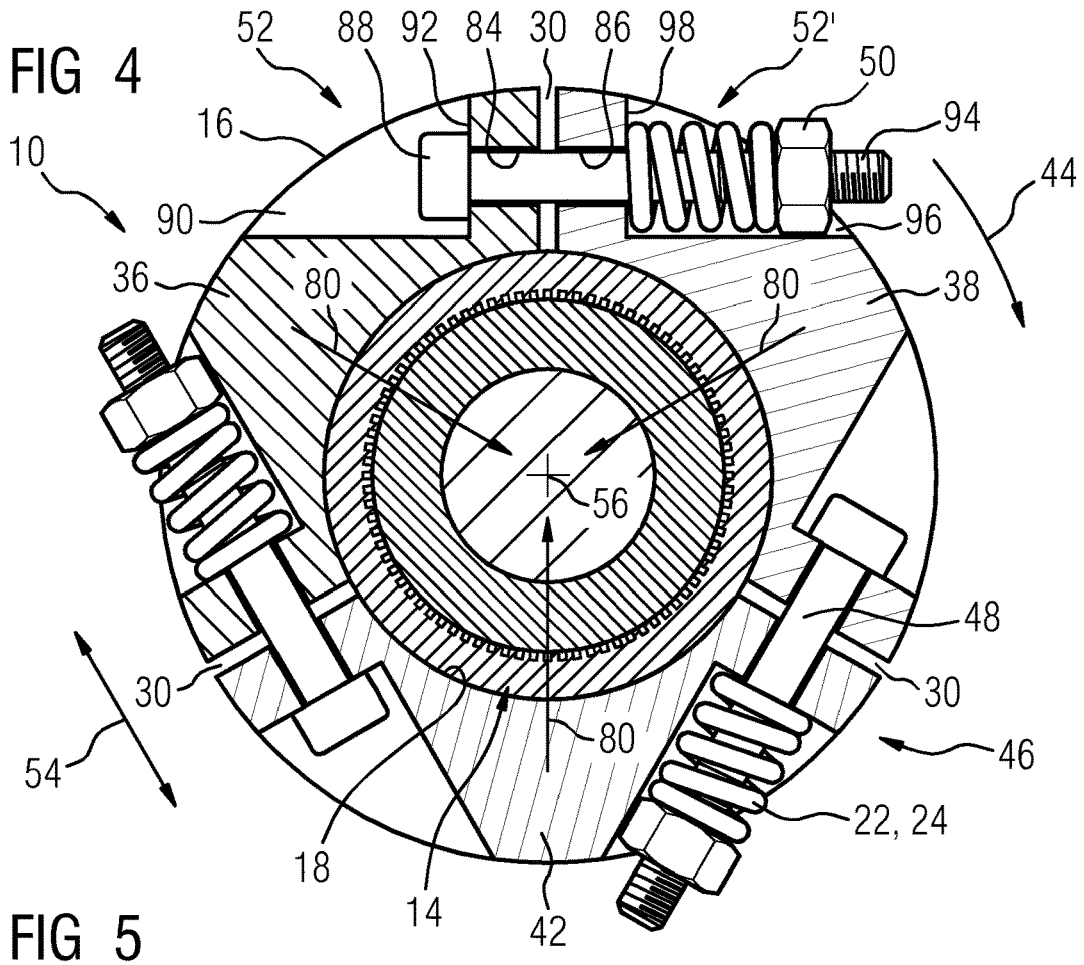

To connect two sections 36, 38, 42 that are arranged on opposed sides 52, 52' of the slot 30 with one another the clamping device 10 comprises a fastening arrangement that is also embodied as a preload arrangement 46, 46'. This is shown in FIG. 4 which shows a cross section along line IV-IV in FIG. 3 through the clamping member 16. The fastening arrangement or the preload arrangement 46, 46', respectively, comprises a bolt 48 and a corresponding nut 50. To mount this arrangement 46, 46' on the clamping device 10 each section 36, 38, 42 comprises a first aperture 84 and a second corresponding aperture 86. These apertures 84, 86 are arranged in circumferential direction 44 of the clamping member 16 on either side 52, 52' of the slot 30. The bolt 48 extends through both apertures 84, 86, wherein a bolt head 88 is positioned in a recess 90 and abuts a stop surface 90 of the first aperture 84 or the recess 90, respectively. A threaded end 94 of the bolt 48 extends in a recess 96 of the respective section 36, 38, 42.

The preloadable element 22 or the spring 24, respectively, is mounted on the bolt 48 so that it abuts a stop surface 98 of the second aperture 86 or the recess 96, respectively. The nut 50 is screwed on the threaded end 94 of the bolt 48 to such an extent so that the spring 24 is preloaded as needed. Hence, the preloadable element 22 or the spring 24, respectively, is held in its preloaded state by the bolt 48 and the corresponding nut 50 or specifically, it is held between the second stop surface 98 and the nut 50.

To provide a homogenous force distribution along the extension 32 of the clamping member 16 a plurality of preload arrangements 46, 46', 46" are arranged in parallel to one another (see FIG. 2). In FIG. 1 an exemplary embodiment with four preload arrangements 46, 46', 46" and in FIGS. 2 and 3 an exemplary embodiment with six preload arrangements 46, 46', 46" is shown. Generally, any number of preload arrangements 46, 46', 46" feasible for a person skilled in the art would be possible.

A direction 54 of a loading force of the preloadable element 22 or the spring 24, respectively, is arranged basically tangential in respect to the receptacle 18 of the clamping member 16. Moreover, the loading force of the preloadable element 22 or the spring 24, respectively, is transferred to the cable 14 in radial direction 80.

The needed loading force depends on the cable and the spring characteristics. Thus, testing was performed with non-sprung grips to determine the pull force achieved with different clamping pressures. This was then translated to individual spring loads, and a combination of clamp area, spring rate, and no of springs was determined to create the optimized design for each cable being considered.

The pressure generated by the specific clamping device 10 applies enough force through the cable layers 78 to retain the required load, without forcing the cable 14 to significantly extrude from a high pressure clamped region (as shown in Finite Element Analysis (FEA)).

Figure 5:
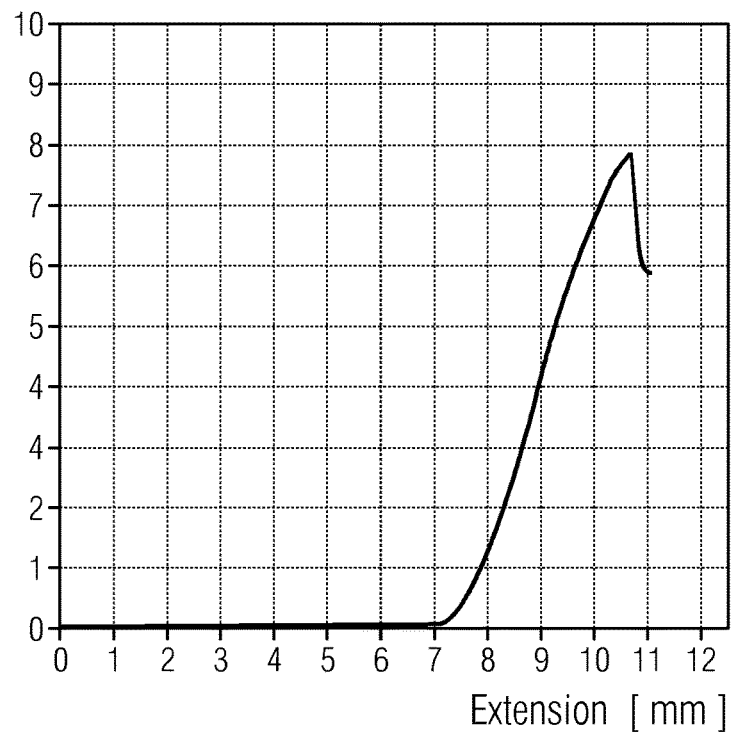

The graph in FIG. 5, which shows a diagram where on the x-axis the extension of the cable in millimeters (mm) and on the y-axis the force in Kilo-Newton (kN) is plotted, shows a pull test performed on the cable 14 mounted in the clamping device 10 of the clamping unit 12. The travel or extension of the test sample before failure in this instance was approximately 3 mm at 8 kN when pulling the cable core relative to the clamping unit 12. The graph shows also another benefit of the clamping unit 12, namely, that it allows very little axial movement of the cable 14. Studying the graph in FIG. 5 the region (on the 'extension' axis) between 7 mm and 8 mm is a relatively shallow curve which accounts for the natural curvature in the cable 14 being tested, straightening out. Therefore to reach the failure load, the tensile machine crosshead has traveled only 2.5 mm.

FIGS. 6 to 11 show four alternative exemplary embodiments of the clamping device 10. Identical components, features and functions are denoted by the same reference numerals. However, to distinguish the exemplary embodiment of FIGS. 6 to 11 over that of FIGS. 1 to 5 the letters 'a' to 'd' have been added to the reference numerals of the components that are designed differently in the exemplary embodiment of FIGS. 6 to 11. The description below is substantially limited to these differences compared to the exemplary embodiment of FIGS. 1 to 5, wherein reference is made to the description of the exemplary embodiment in FIGS. 1 to 5 with respect to identical components, features, and functions.

Figure 6:
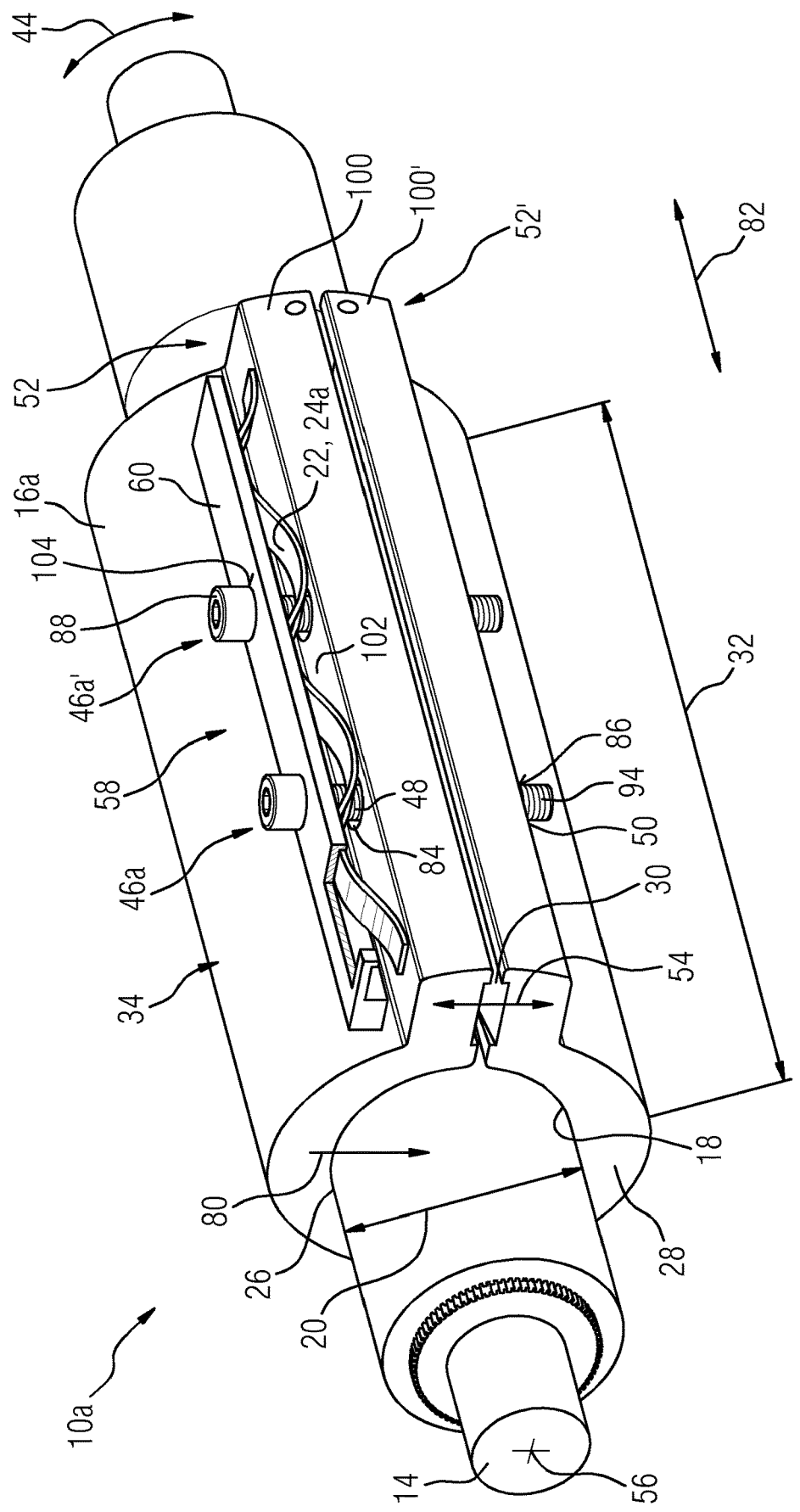
FIG. 6: shows a first alternatively embodied clamping device with a wave spring.

FIG. 6 shows a first alternative embodiment of the clamping device 10. The clamping device 10a of FIG. 6 differs from the clamping device 10 of FIGS. 1 to 5 in that the preloadable element 22 is embodied as a wave spring 24a.

A clamping member 16a of a clamping unit for clamping a cable 14 is basically embodied as a cylindrical tube, especially as a clamp sleeve 34. Along its circumference it is divided by a slot 30. This slot 30 is restricted in circumferential direction 44 on either side 52, 52' of the slot 30 by a radial flange 100, 100', arranged in parallel to one another and extending like the slot 30 all along an axial extension 32 of the clamping member 16a.

To adjust a cross section 20 of a receptacle 18, comprising an orifice 26 surrounded by a wall 28, the clamping device 10a comprises a preload unit 58 and an adjustment element 22 embodied as a preloadable element 22 or specifically, as a wave spring 24a. The preload unit 58 comprises two preload arrangements 46a, 46a' arranged in parallel to one another. Each preload arrangement 46a, 46a' comprises a bolt 48 and a corresponding nut 50, and further a shim 60.

The shim 60 is arranged in parallel to one of the flanges 100 and with a tangential distance determined by a height of the wave spring 24a. Thus, the wave spring 24a is arranged in a space 102 between the shim 60 and the flange 100. The bolt 48 extends through an aperture 104 of the shim 60 and through two corresponding apertures 84, 86 of the flanges 100, 100'. The nut 50 is screwed to a threaded end 94 of the bolt 48 thus holding the preloadable element 22 or the wave spring 24a in its preloaded state. Hence, the shim 60 is positioned in such a way by the bolt 48 and the corresponding nut 50 so that it distributes a loading force of the wave spring 24a to the two preloading arrangements 46a, 46a'. A direction 54 of a loading force of the preloadable element 22 or the wave spring 24a is arranged basically tangential in respect to the receptacle 18 of the clamping member 16a. The wave spring 24a is positioned adjacent to the bolts 48. Generally, it would be also possible for the bolts to pass through apertures in the spring. To allow the spring to be compressed and thus allow it to extend slightly in axial direction the bolts must extend through the apertures with radial play.

It may be also possible to arrange a further set of flanges with a preload unit and a wave spring at an opposed side to the first set of flanges with the preload unit and the wave spring. In such an embodiment the clamping member would be basically embodied as a half-shell. Even a plurality of sets of flanges with respective preload units and wave springs would be possible.

Figure 7:
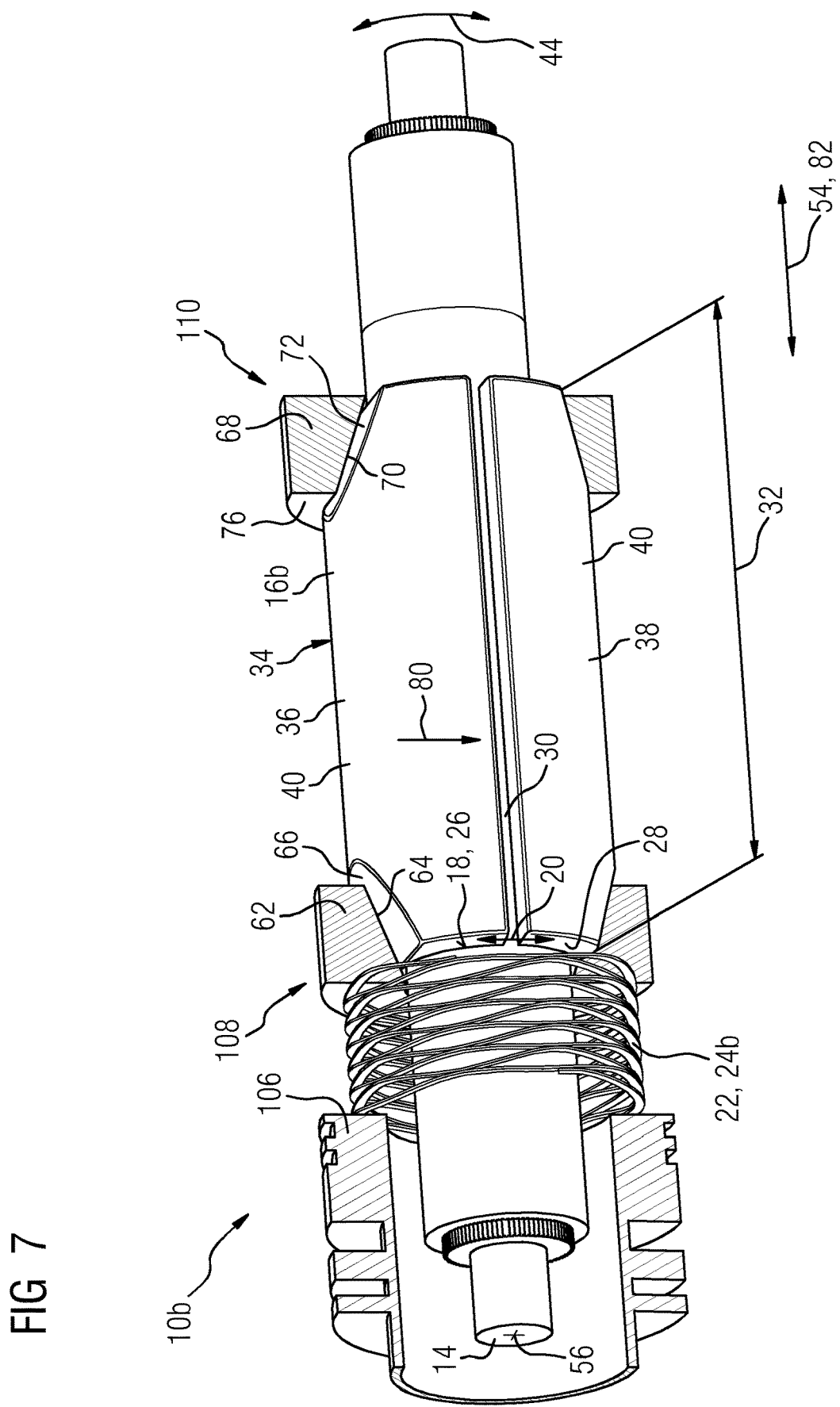
FIG. 7: shows a second alternatively embodied clamping device with an axially arranged coil spring

FIG. 7 shows a second alternative embodiment of the clamping device 10. The clamping device 10b of FIG. 7 differs from the clamping device 10 of FIGS. 1 to 5 in that the preloadable element 22 is embodied as an axially arranged coil spring 24b. The coil spring 24b comprises several alternatingly arranged circular wave springs (not labelled with reference numerals).

A clamping member 16b of a clamping unit for clamping a cable 14 is basically embodied as a cylindrical tube, especially as a clamp sleeve 34. Further, it comprises two sections 36, 38, wherein each section 36, 38 comprises a half-shell region 40 restricting an orifice 26 of a receptacle 18 of the clamping member 16b. Along its circumference it is divided by two slots 30 (only one slot is shown in FIG. 7). These slots 30 extend all along an axial extension 32 of the clamping member 16b.

To adjust a cross section 20 of the receptacle 18, comprising an orifice 26 surrounded by a wall 28, the clamping device 10b comprises the axially arranged coil spring 24b, wherein a direction 54 of a loading force of the preloadable element 22 or the coil spring 24b, respectively, is arranged axially to an axis 56 of the clamping member 16b. Furthermore, the clamping device 10b comprises a first axial abutment element 62 for the preloadable element 22 or the coil spring 24b, respectively. The coil spring 24b is axially clamped between a stopper 106 that is axially fixed to a housing of the clamping unit and the first abutment element 62. This first abutment element 62 is arranged axially moveable due to an axial loading force applied by the preloadable element 22 or the coil spring 24b, respectively, and is embodied as a ring surrounding an end region 108 of the clamping member 16b.

Moreover, the first abutment element 62 has a tapered section 64 and the clamping member 16b or its end region 108, respectively, comprises a corresponding tapered section 66. The tapered section 64 of the first abutment element 62 and the corresponding tapered section 66 of the clamping member 16b translate an axial loading force of the preloadable element 22, or the coil spring 24b, respectively, in a circumferential surface load of the clamping member 16b. Hence, the loading force is directed in radial direction 80.

To facilitate this force translation a movement of the clamping member 16b in axial direction 82 must be limited. Therefore, the clamping device 10b comprises a second fixed abutment element 68 that is embodied as a ring and surrounds an end region 110 of the clamping member 16b that is arranged axially opposed to the end region 108. The second abutment element 68 has a tapered section 70 and the clamping member 16b comprises a corresponding tapered section 72 and wherein the tapered section 70 of the second abutment element 68 translates a circumferential surface load on the corresponding tapered section 72 of the clamping member 16b.

Due to this construction and function and in case the cable 14 expands the clamping member 16b is slightly pushed in the direction of the coil spring 24b, thereby also pushing the first abutment element 62 so that the coil spring 24b is compressed.

The second abutment element 68 may be constructed fastened to or formed integrally with a housing of the clamping unit and thus be also a locking element 76.

Figure 8:
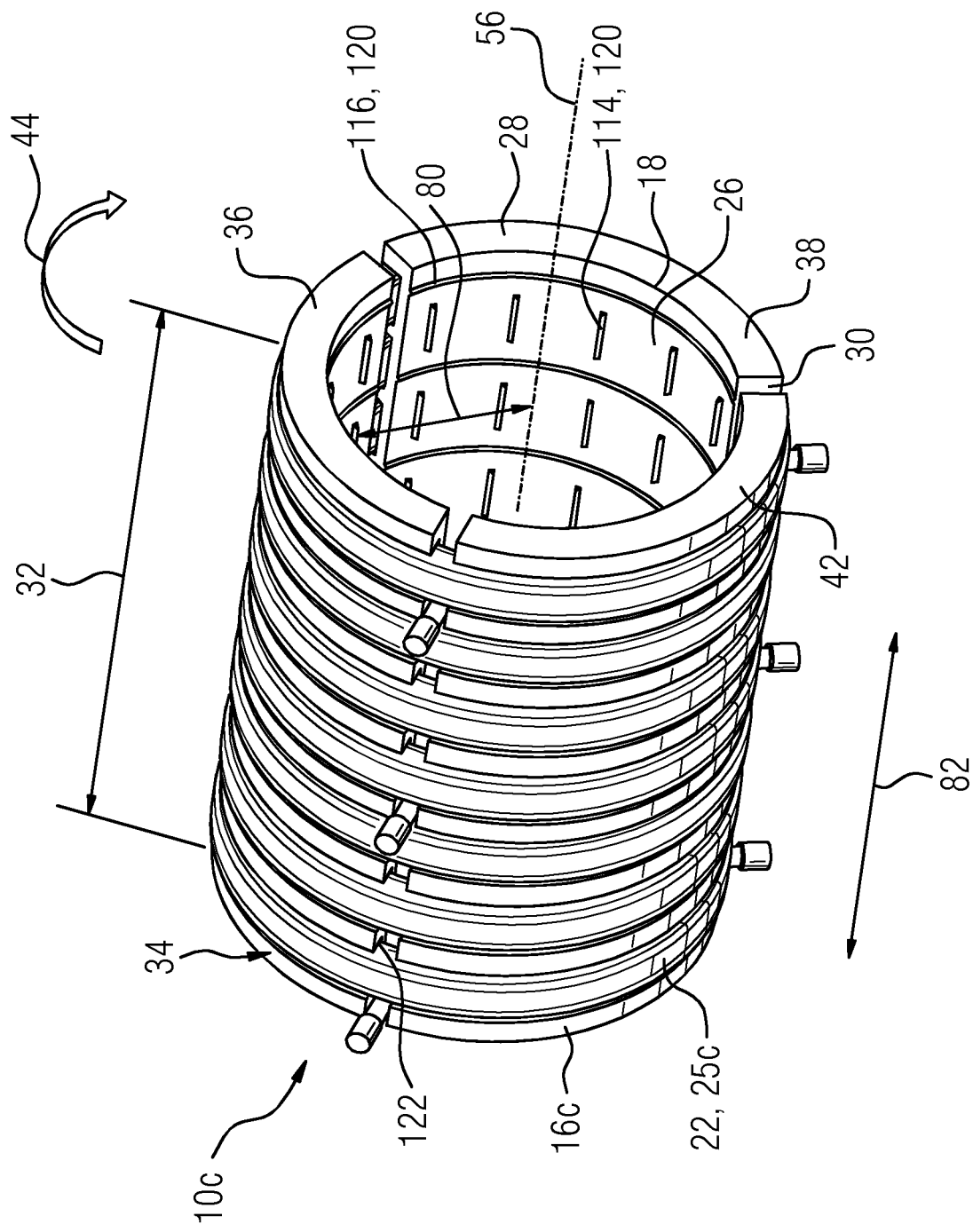
FIG. 8 shows a third alternative embodied clamping device with elastic rings as preloadable element.
Figure 9:
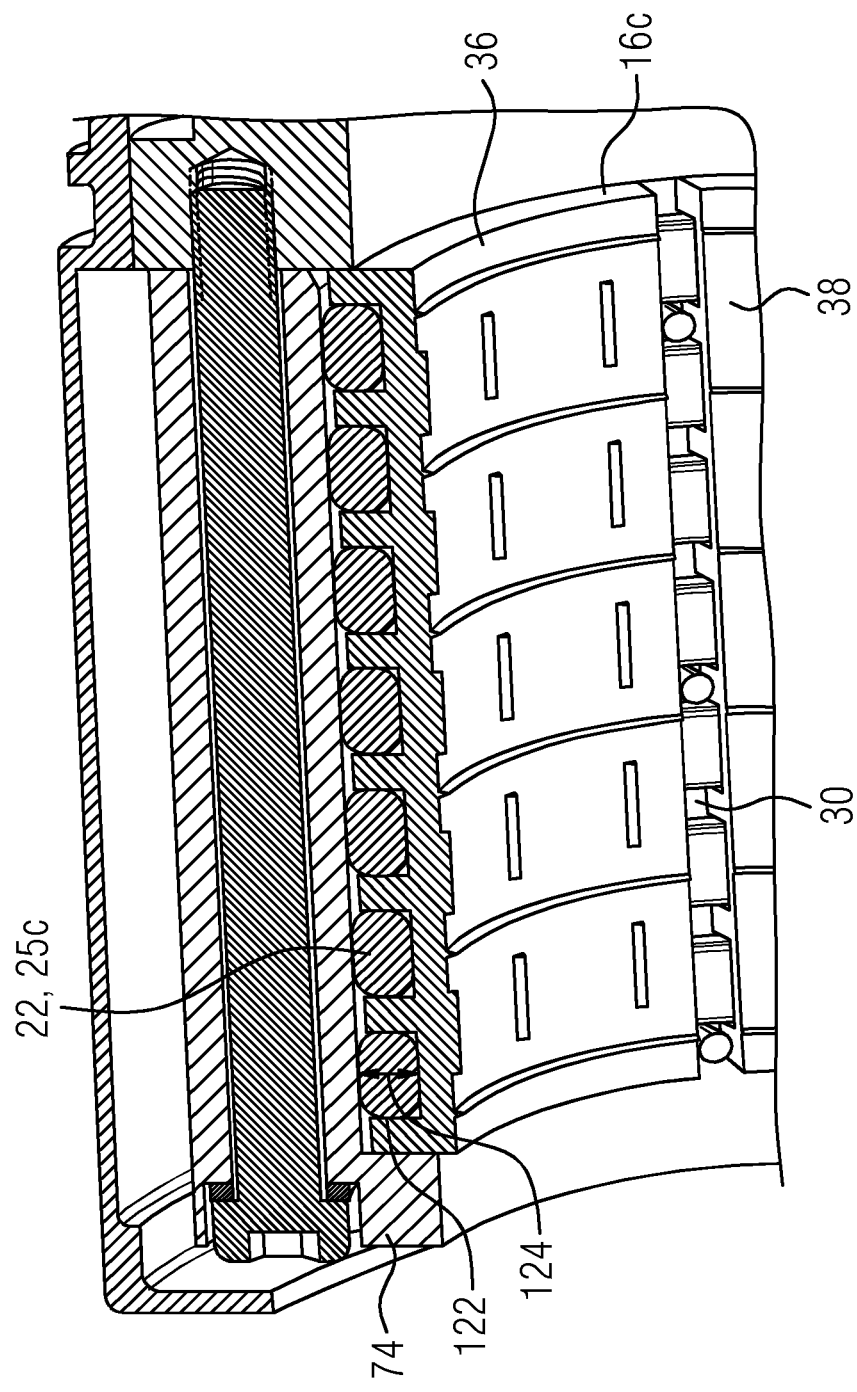
FIG. 9 shows the clamping device from FIG. 8 assembled in a housing.

FIGS. 8 and 9 show a third alternative embodiment of the clamping device 10. The clamping device 10c of FIGS. 8 and 9 differs from the clamping device 10 of FIGS. 1 to 5 in that the preloadable element 22 is embodied as an elastic element in the form of an elastic ring 25c (e.g. an O-ring) e.g. out of a rubber moulding. As could be seen in FIG. 8 a plurality of elastic rings 25c or rubber mouldings, in this exemplary embodiment seven, are place on an outside of and around the compliant clamp segments or sections 36, 38, 42 of a clamping member 16c, wherein the clamping member 16c or its three sections 36, 38, 42 is/are embodied as or form a cylindrical tube or clamp sleeve 34, respectively. Moreover, the elastic rings 25c are positioned in recesses 122 that are formed in the clamping member 16c or its sections 36, 38, 42, respectively, and extend along a circumference 118 (in circumferential direction 44) of the clamping member 16c. The elastic rings 25c or the recess 122, respectively, are spaced equidistantly apart along an extension 32 of the clamping member 16c. A loading force of the preloadable element 22 or of the elastic rings 25c is arranged radially (in radial direction 80) to an axis 56 of the clamping member 16c.

A thusly assembled arrangement would then be placed in a housing 74 to compress the elastic rings 25c as could be seen in FIG. 9. Due to the compression a material thickness of the elastic rings 25c is reduced to a smaller diameter 124 than a diameter of the elastic element or ring 25c in the uncompressed state of the elastic rings 25c. This compression of the elastic rings 25c generates the final compressive force to hold a cable (not shown). Moreover, a width in axial extension 32 of a recess 122 should be wider than a width of the preloadable element 22 or the elastic ring 25c in its uncompressed state to allow the compression of the preloadable element 22 or the elastic rings 25c.

Figure 10:
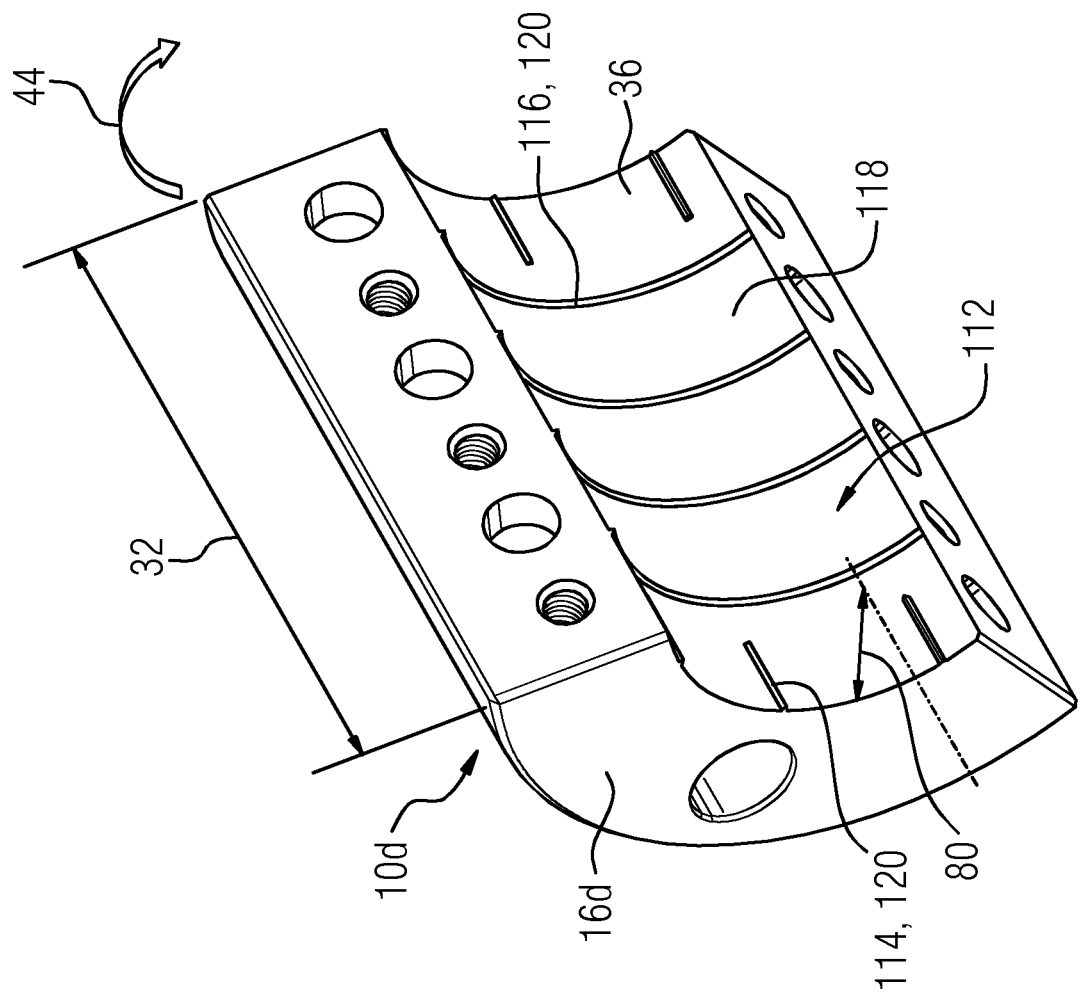
FIG. 10 shows a section of a forth alternative embodied clamping device with several holding elements
Figure 11:
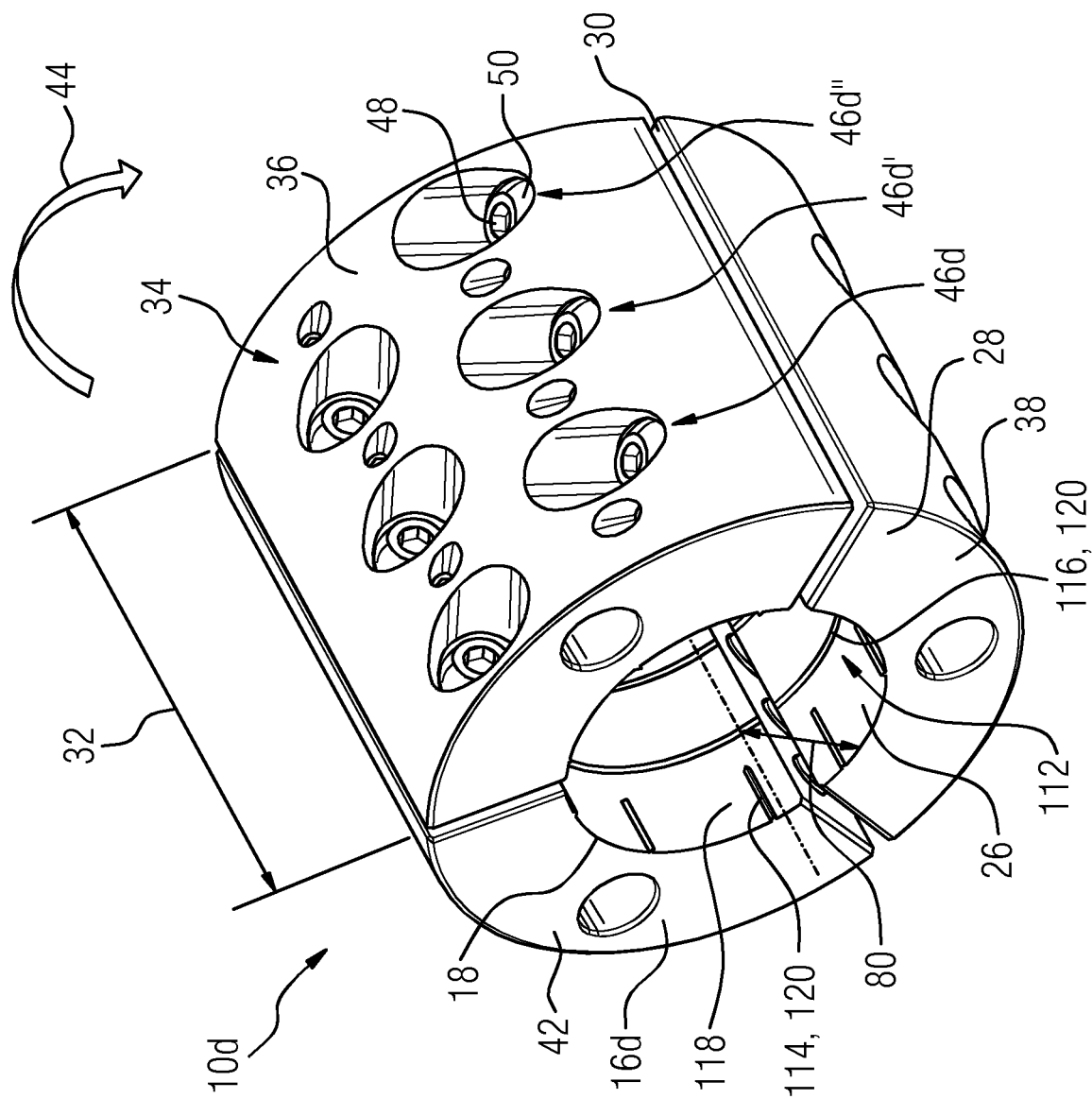
FIG. 11 shows the clamping device from FIG. 10 in an assembled state.

FIGS. 10 and 11 show a fourth alternative embodiment of the clamping device 10. The clamping device 10d of FIGS. 10 and 11 differs from the clamping device 10 of FIGS. 1 to 5 in that an inner surface 112, facing a cable in an assembled state, of a wall 28 of a receptacle 18 of a clamping member 16d comprises several holding elements 114, 116 so that the clamping member 16d can resist both pulling and twisting forces on the cable.

The holding elements 114, 116 are embodied as teeth 120 extending in radial direction 80 towards an axis 56 of the clamping member 16d as shown in FIG. 10. One kind of holding elements 114 further extend axially and at least partially along an axial extension 32 of the clamping member 16d or its sections 36, 38, 42. Another kind of holding elements 116 further extend circumferential (in circumferential direction 44) and along a circumference 118 of the clamping member 16d or its sections 36, 38, 42. The holding elements may also extend along the whole extension of the clamping member being only interrupted by circumferentially arranged holding elements (see also in FIGS. 8 and 9). The vice versa arrangement may also be possible. An assembled clamping member 16d where all segments or sections 36, 38, 42 have small axial and circumferential teeth 120 is shown in FIG. 11.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A clamping device of a clamping unit for at least one cable, comprising:
   a clamping member with at least one receptacle for the at least one cable, wherein a cross section of the at least one receptacle is adjustable,
   at least one adjustment element that is embodied such that it takes effect on the clamping member so that the cross section of the at least one receptacle is adjusted,
   wherein the at least one adjustment element is embodied as a preloadable element,
   a first axial abutment element for the preloadable element, wherein the first axial abutment element is arranged axially moveable due to an axial loading force applied by the preloadable element, and wherein the first axial abutment element comprises a tapered section,
   wherein the clamping member comprises a corresponding tapered section and wherein the tapered section of the first axial abutment element and the corresponding tapered section of the clamping member translate the axial loading force of the preloadable element in a circumferential surface load of the clamping member,
   wherein the at least one receptacle comprises at least one orifice and a wall partially encompassing the at least one orifice, and
   wherein the wall comprises at least two slots.

2. The clamping device according to claim 1, further comprising:
   a second fixed abutment element comprising a tapered section,
   wherein the clamping member comprises a tapered section that corresponds to the tapered section of the second fixed abutment element, and
   wherein the tapered section of the second fixed abutment element translates a circumferential surface load on the corresponding tapered section of the clamping member.

3. The clamping device according to claim 1, wherein the preloadable element comprises a spring.

4. The clamping device according to claim 3,
   wherein the spring comprises a coil spring, a disc spring, or a wave spring.

5. The clamping device according to claim 1,
   wherein the clamping member comprises an axial extension and wherein the at least two slots extend all along the axial extension.

6. The clamping device according to claim 1,
   wherein the clamping member is embodied as a cylindrical tube or as a clamp sleeve.

7. The clamping device according to claim 1,
   wherein the clamping member comprises two sections, wherein each section comprises a half-shell region restricting at least one orifice of the at least one receptacle.

8. The clamping device according to claim 1,
wherein the wall of the at least one receptacle of the clamping member comprises an inner surface, and
wherein the inner surface comprises at least one holding element, and
wherein the at least one holding element extends at least partially along an axial extension of the clamping member, and
wherein the at least one holding element extends at least partially along a circumference of the clamping member.

9. A clamping unit, comprising:
the clamping device according to claim 1,
a housing surrounding the clamping device, and
at least one locking element to provide an axial locking of the clamping device with the housing.

10. A clamping device of a clamping unit for a cable, comprising:
a clamping member with a receptacle for the cable, wherein a cross section of the receptacle is adjustable,
at least one adjustment element that is embodied such that it takes effect on the clamping member so that the cross section of the receptacle is adjusted,
wherein the at least one adjustment element is embodied as a preloadable element,
a first axial abutment element for the preloadable element, wherein the first axial abutment element is arranged axially moveable due to an axial loading force applied by the preloadable element, and wherein the first axial abutment element comprises a tapered section,
wherein the clamping member comprises a corresponding tapered section and wherein the tapered section of the first axial abutment element and the corresponding tapered section of the clamping member translate the axial loading force of the preloadable element in a circumferential surface load of the clamping member, and
wherein a contact surface of clamping member is matched to a circular contact surface of the cable providing a homogeneous contact between the clamping member and the cable as well as a homogeneous load transmission.

* * * * *